United States Patent Office

Re. 24,094
Reissued Nov. 22, 1955

24,094

STOP-LEAK PREPARATION

Frederic D. Barton, Dearborn, Mich.

No Drawing. Original No. 2,580,719, dated January 1, 1952, Serial No. 189,484, October 10, 1950. Application for reissue February 14, 1955, Serial No. 488,177

4 Claims. (Cl. 106—33)

Matter enclosed in heavy brackets [ ] appears in the original patent but forms no part of this reissue specification; matter printed in italics indicates the additions made by reissue.

My invention relates to stop-leak preparations, and more particularly to that type of stop-leak preparation employed in the cooling system of engines, and has particular reference to the cooling system of automotive vehicles through not necessarily limited thereto.

Those prior art stop-leak preparations, of which I am aware, function on the theory of forming a film or coating over the leak while in the process of being circulated around the cooling system, and while such preparations can be relied on to produce quick results in the desired direction, the film or coating thus formed, remains directly exposed to the wearing action of the circulating water in the system and the abrasive action of any rust or grit which may be circulating around with the water.

This application is a continuation-in-part of my application for Stop-Leak-Preparation, Serial No. 15,721, filed March 18, 1948, now abandoned.

Among the objects of my invention are:

(1) To provide a novel and improved stop-leak preparation;

(2) To provide a novel and improved stop-leak preparation which shall produce a more durable seal;

(3) To provide a novel and improved stop-leak preparation having lubricating qualities beneficial to the water pump in a cooling system;

(4) To provide a novel and improved stop-leak preparation capable of sealing cracks in radiator and engine blocks and seal leaks around hose connections;

(5) To provide a novel and improved stop-leak preparation which possesses the additional factor of inhibiting the formation of rust, thus maintaining a clean cooling system;

(6) To provide a novel and improved stop-leak preparation which will not congeal on exposure to the atmosphere;

(7) To provide a novel and improved stop-leak preparation which blends well with known anti-freeze solutions;

(8) To provide a novel and improved stop-leak preparation having no deteriorating action on rubber or metal;

(9) To provide a novel and improved stop-leak preparation which will not deteriorate with time;

(10) To provide a novel and improved stop-leak preparation which may be readily prepared from cheap and well-known ingredients;

(11) To provide a novel and improved stop-leak preparation which will not form sludgy deposits.

Additional objects of my invention will be brought out in the following description of a preferred embodiment of the same.

My invention is based upon the discovery that plant roots, including *rhizomes* [rhyzomes], when suitably prepared, have properties rendering them exceedingly effective in the stopping of leaks. In the preparation of my stop-leak preparation, the root is ground to the consistency of flour, preferably one which will pass through a 50 mesh screen, that is a screen presenting 2500 openings per square inch of surface, following which, the root flour is mixed with oil and preferably an oil of the type known as a soluble cutting oil.

A soluble oil, as defined in the Chemical and Engineering Dictionary (p. 114), published by the Chemical Publishing Co. of New York, Inc., of New York city, is an oil having an emulsifier, with or without an auxiliary solvent dissolved in it, to make it dispersible in water. Soluble oil is conventionally employed in machine shop practice where it is known as cutting oil.

The relative proportions of the root floor to oil is not critical, though I prefer to employ approximately 2 pounds of the flour to each gallon of oil, and in using the same as a stop-leak preparation, it is added to the cooling system of an engine in the approximate ratio of 1¼ ounces of the preparation for each gallon of water in the system.

From the view-point of cost, I have found ginger root flour to be preferred, though from the view-point of effectiveness as a stop-leak ingredient, other roots such as orris, tumeric, blood root, licorice, poke and sarsaparilla have comparable qualities.

As a suitable cutting oil for use with the root flour, I prefer to employ an oil marketed by the Texas Oil Co. under the designation "810 Soluble Oil C" and said by such company to contain 9% oil soluble sodium sulphonates, the sulphonic acids being derived from petroleum, and I prefer such oil because of its non-drying character.

What the action is, is not apparent to me at this time, but I have noticed that the ginger root flour when mixed with the soluble oil, settles down into a more compact and dense mass than when mixed directly with water. In comparative tests on this basis, employing equal amounts by weight of the ginger root flour, the flour in the oil, settled out into a compact mass which measured approximately 80% of the volume occupied by the material settling out of the water mixture.

It is conceivable, therefore, that what actually happens, is that the ginger root flour, by reason of its small particle size, is carried into the leaks however small, by the water, and gradually packs itself in, forming a dense and compact seal. Further evidence in support of this resides in the fact that complete stoppage of a leak is not instantaneous nor is such result realized within the brief period of time in which prior art film forming type of stop-leak preparations function. Once the leak is stopped however, its durability is much more permanent.

Inasmuch as my stop-leak preparation does not rely on exposure to air for its effectiveness in plugging leaks, the preparation will not only stop seepage and leaks in the radiator and hose connections of an automotive cooling system which are exposed to the atmosphere, but also such leaks as may exist around the combustion chambers of an engine, such as cracked engine blocks, deficient head gaskets, etc., and is particularly effective in such situations in that the intense heat of combustion seems to convert the preparation or components thereof at the point of leak, into insoluble carbides to form a permanent seal.

Aside from the sealing properties of my stop-leak preparation, the mixture aids in lubrication of the water pump usually incorporated in a cooling system, and further functions as a rust inhibiter, thus maintaining the cooling system clean and free of rust, sediment and sludge.

While the root flour and soluble cutting oil constitute the essential ingredients of my stop-leak preparation, it is contemplated that other ingredients capable of effecting a beneficial function in conjunction therewith may be incorporated in the preparation. Thus, I have found, for example, that crushed or ground nut shells such as almond shells, when circulated through the cooling system of an engine, have the ability to exert a mild scouring action on the walls of the cooling system, sufficient to maintain said walls clean and without deleterious effect on the cooling system.

I claim:

[1. A stop-leak preparation for the cooling system of an engine, consisting essentially of ginger root flour and soluble oil.]

[2. A stop-leak preparation for the cooling system of an engine, consisting essentially of ginger root flour and soluble oil in proportions roughly of two pounds of ginger root flour to a gallon of soluble oil.]

[3. A stop-leak preparation for the cooling system of an engine, comprising a mixture of a rhizome flour and soluble oil.]

*4. A stop-leak, essentially anhydrous preparation for the cooling system of an engine, consisting essentially of ginger root flour and soluble oil.*

*5. A stop-leak, essentially anhydrous preparation for the cooling system of an engine, consisting essentially of ginger root flour and soluble oil in proportions roughly of two pounds of ginger root flour to a gallon of soluble oil.*

*6. A stop-leak, essentially anhydrous preparation for the cooling system of an engine, comprising a mixture of a rhizome flour and soluble oil.*

*7. A stop-leak, essentially anhydrous preparation for the cooling system of an engine, consisting essentially of a mixture of a rhizome flour and soluble oil.*

No references cited.